United States Patent
Chen et al.

(10) Patent No.: US 9,671,611 B2
(45) Date of Patent: *Jun. 6, 2017

(54) OPTICAL CELL WITH WAVELENGTH COMPENSATOR

(71) Applicant: Finisar Corporation, Sunnyvale, CA (US)

(72) Inventors: Fan Chen, Shanghai (CN); Huiping Li, Shanghai (CN); Jiangtao Zhang, Shanghai (CN); Fahua Lan, Shanghai (CN)

(73) Assignee: FINISAR CORPORATION, Sunnyvale, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/692,201

(22) Filed: Apr. 21, 2015

(65) Prior Publication Data

US 2015/0226963 A1    Aug. 13, 2015

Related U.S. Application Data

(63) Continuation of application No. 13/935,276, filed on Jul. 3, 2013, now Pat. No. 9,075,233.

(30) Foreign Application Priority Data

Jul. 4, 2012   (CN) .......................... 2012 1 0229043

(51) Int. Cl.
  *G02B 26/00*   (2006.01)
  *G02B 27/00*   (2006.01)
  *G02B 26/06*   (2006.01)
  *G02B 17/02*   (2006.01)
  *G02B 27/10*   (2006.01)
  *G02B 27/28*   (2006.01)
  (Continued)

(52) U.S. Cl.
  CPC ....... *G02B 27/0068* (2013.01); *G02B 17/023* (2013.01); *G02B 26/002* (2013.01); *G02B 26/007* (2013.01); *G02B 26/06* (2013.01); *G02B 27/10* (2013.01); *G02B 27/283* (2013.01); *G02B 27/286* (2013.01); *G02B 6/272* (2013.01); *G02B 6/2935* (2013.01); *G02B 6/29386* (2013.01)

(58) Field of Classification Search
  USPC .................................................. 359/290–295
  See application file for complete search history.

(56) References Cited

U.S. PATENT DOCUMENTS 6,654,564 B1   11/2003   Colbourne et al.
6,943,938 B1   9/2005   Liu et al.
(Continued)

FOREIGN PATENT DOCUMENTS

CN   1295258 A   5/2001
CN   2674469 Y   1/2005
(Continued)

*Primary Examiner* — Mohammed Hasan
(74) *Attorney, Agent, or Firm* — Maschoff Brennan (57) ABSTRACT

An optical cell may include a first port coupled to a second port by an optical path. The optical cell may also include a compensator disposed in the optical path. The compensator may be rotatable about an axis. Rotating the compensator about the axis may vary a distance that the optical path passes through the compensator thereby changing the optical path length of the optical path.

17 Claims, 6 Drawing Sheets

(51) Int. Cl.
  G02B 6/27    (2006.01)
  G02B 6/293   (2006.01)

(56) References Cited

U.S. PATENT DOCUMENTS

| | | | | |
|---|---|---|---|---|
| 7,019,724 | B2* | 3/2006 | Ide | G02F 1/0136 345/58 |
| 8,270,067 | B1* | 9/2012 | Hsieh | H04B 10/677 356/477 |
| 8,433,204 | B2* | 4/2013 | Li | 359/325 |
| 9,075,233 | B2* | 7/2015 | Chen | G02B 26/06 |
| 2005/0094268 | A1* | 5/2005 | Fiolka | G02B 27/0994 359/489.05 |
| 2012/0257206 | A1* | 10/2012 | Wang | H04B 10/677 356/450 |

FOREIGN PATENT DOCUMENTS

| | | |
|---|---|---|
| CN | 101021597 | 8/2007 |
| CN | 101021597 A | 8/2007 |
| CN | 101458073 | 6/2009 |
| CN | 101458073 A | 6/2009 |

* cited by examiner

OPTICAL CELL WITH WAVELENGTH COMPENSATOR

CROSS-REFERENCE TO RELATED APPLICATIONS

This patent application is a continuation of U.S. patent application Ser. No. 13/935,276, filed Jul. 3, 2013 Now U.S. Pat. No. 9,075,233 B2, which claims priority to Chinese Patent Application No. 201210229043.8, filed Jul. 4, 2012, which applications are incorporated herein by reference.

BACKGROUND

Field of the Invention

The present invention generally relates to optical communication systems. More particularly, some example embodiments relate to an optical cell that may be used in some optical communication systems.

Related Technology

Some optical communication system may rely on splitting a light beam into multiple components. For example, optical communication systems that employ the use of delay line interferometers (DLIs) and interleavers may split light beams into multiple components. In some circumstances, wavelength uniformity between the multiple components of the light beam, and in particular, uniformity of the central wavelengths of the multiple components, may allow for better polarization mode dispersion performance and chromatic dispersion performance in these optical communication systems.

One method to achieve central wavelength uniformity in multiple components of a light beam may be to select materials with certain qualities to split the light beam and manipulate the multiple components of the light beam. Obtaining material with the desired qualities may be difficult in some circumstances and the screening process to identify the material with the desired qualities may be time consuming.

The subject matter claimed herein is not limited to embodiments that solve any disadvantages or that operate only in environments such as those described above. Rather, this background is only provided to illustrate one exemplary technology area where some embodiments described herein may be practiced.

SUMMARY

Some example embodiments generally relate to an optical cell.

In an embodiment, an optical cell may include a first port coupled to a second port by an optical path. The optical cell may also include a compensator disposed in the optical path. The compensator may be rotatable about an axis. Rotating the compensator about the axis may vary a distance that the optical path passes through the compensator thereby changing the optical path length of the optical path.

In an embodiment, an optical cell may include a first block that may be configured to split a light beam into first and second components and direct the first component into a first optical path having a first optical path length and the second component into a second optical path having a second optical path length. The optical cell may also include a second block that may be positioned within the first and second optical paths and configured to join the first and second components into an output beam. The optical cell may also include a compensator that may be disposed in the first optical path between the first and second blocks. The compensator may be rotatable about an axis. Rotating the compensator about the axis may vary a distance that the first optical path passes through the compensator thereby changing the optical path length of the first optical path.

In an embodiment, an optical cell may include a splitter that may be configured to split a light beam into first and second components. The optical cell may also include a coupler that may be configured to join the first and second components into an output beam. The optical cell may also include a compensator that may be disposed between the splitter and the coupler and positioned to receive the first component from the splitter. The compensator may be rotatable about an axis. Rotating the compensator about the axis may vary a distance that the first component passes through the compensator thereby changing an optical path length through which the first component travels.

This Summary is provided to introduce a selection of concepts in a simplified form that are further described below in the Detailed Description. This Summary is not intended to identify key features or essential characteristics of the claimed subject matter, nor is it intended to be used as an aid in determining the scope of the claimed subject matter.

Additional features and advantages of the invention will be set forth in the description that follows, and in part will be obvious from the description, or may be learned by the practice of the invention. The features and advantages of the invention may be realized and obtained by means of the instruments and combinations particularly pointed out in the appended claims. These and other features of the present invention will become more fully apparent from the following description and appended claims, or may be learned by the practice of the invention as set forth hereinafter.

BRIEF DESCRIPTION OF THE DRAWINGS

A more particular description of the invention will be rendered by reference to embodiments thereof, which are illustrated in the appended drawings. It is appreciated that these drawings depict only some embodiments of the invention and are therefore not to be considered limiting of its scope. The invention will be described and explained with additional specificity and detail through the use of the accompanying drawings in which.

DETAILED DESCRIPTION

Figure 1:
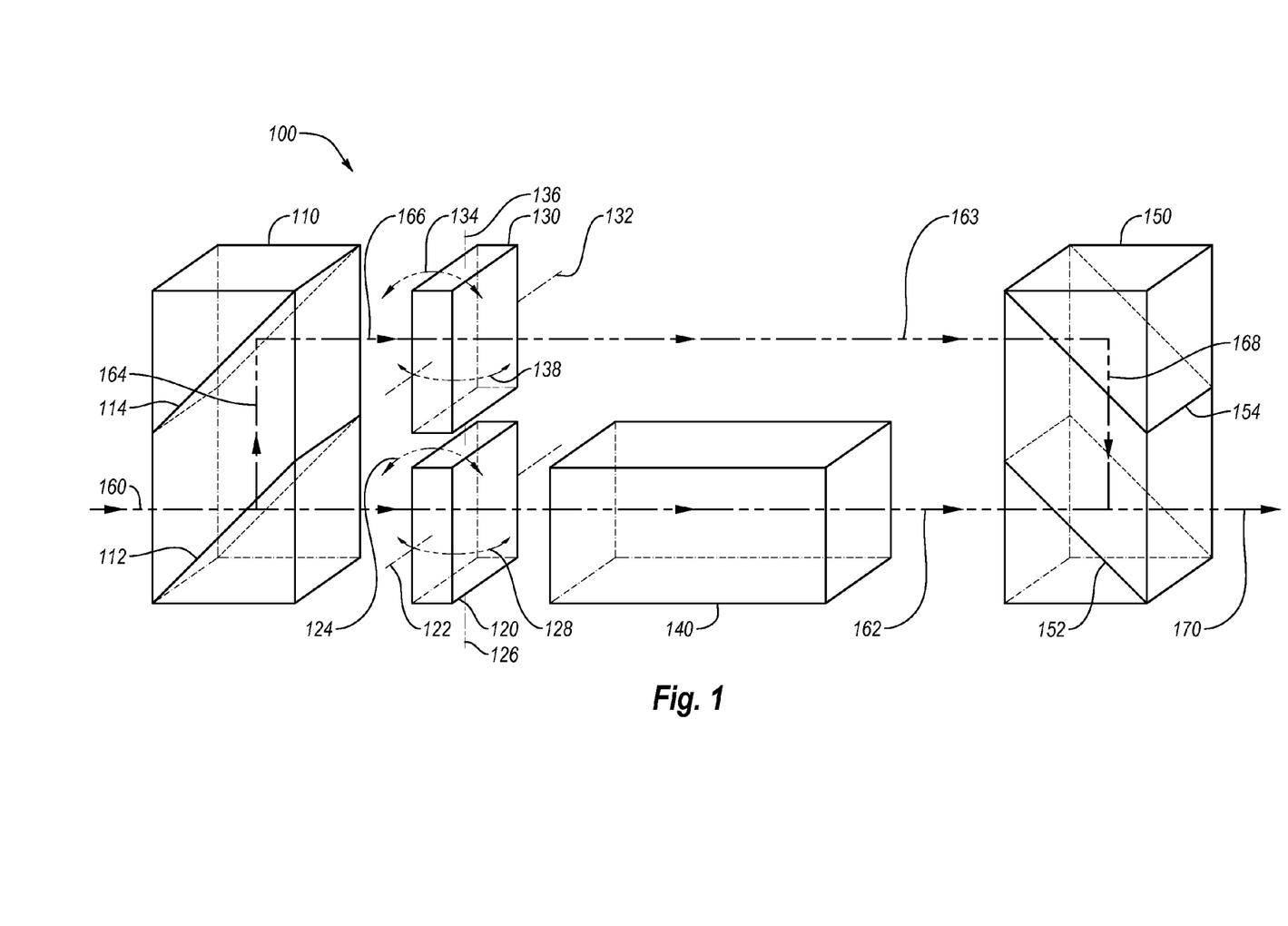
FIG. 1 illustrates a perspective view of an optical cell.

FIG. 1 illustrates a perspective view of an optical cell 100, arranged in accordance with at least some embodiments described herein. In some embodiments, the optical cell 100 and/or other optical cells disclosed herein may be implemented in, for instance, a DLI, an interleaver, a deinterleaver, or other environments in which it may be desirable to improve polarization mode dispersion (PMD), chromatic dispersion (CD) and/or polarization dependent frequency shift by, e.g., providing central wavelength uniformity between two separate light beams propagating within the optical cell 100.

The optical cell 100 includes one or more optical elements that may include opposing first and second blocks 110, 150 displaced from one another by an optical block 140 and first and second compensators 120, 130. The first block 110 contains a splitter 112 and a first reflector 114. The second block 150 contains a coupler 152 and a second reflector 154. Each of the first and second compensators 120, 130 has a first respective axis of rotation 122, 132 and second a respective axis of rotation 126, 136. The first compensator 120 may be configured to rotate around the first axis 122 in the direction of arrow 124 and may be configured to rotate around the second axis 126 in the direction of arrow 128. The second compensator 130 may be configured to rotate around the first axis 132 in the direction of arrow 134 and may be configured to rotate around the second axis 136 in the direction of arrow 138.

As illustrated, the optical cell 100 is configured to split an incoming light beam 160 into two components or channels using the splitter 112 and to later realign the components using the coupler 152 onto a common propagation axis as an output beam 170. The two components of the light beam 160 follow two distinct optical paths 162, 163. In some embodiments, a first component of the light beam 160 follows a first optical path 162. The first optical path 162 passes through the first block 110, the first compensator 120, the optical block 140, and the second block 150. A second component of the light beam 160 follows a second optical path 163 that includes first, second, and third legs 164, 166, 168. The second optical path 163 passes through the first block 110, the second compensator 130, and the second block 150.

In some embodiments, the first and second optical paths 162, 163 have different optical path lengths. Furthermore, in some embodiments, the optical path lengths of the first and second optical paths 162, 163 may be changed by rotating the first and second compensators 120, 130 respectively on their respective first axes 122, 132 and/or their respective second axes 126, 136. In some embodiments, adjusting the optical path lengths of the first and second optical paths 162, 163 may allow for adjusting a center wavelength of the components of the light beam 160. Furthermore, with different optical path lengths, a delay may be introduced between the two components of the light beam 160.

With the introduction of a delay between different components of the light beam 160, the optical cell 100 may be used in an interleaver to space apart the components of the light beam 160 within the output beam 170. In some embodiments, the optical cell 100 may be used in a DLI for converting an optical differential phase-shift keying (DPSK) signal to an intensity-keyed signal. In some embodiments, the optical cell 100 may be used for other purposes within an optical system or device. Further explanation of how the optical cell 100 affects the light beam 160 is explained with respect to FIGS. 2A and 2B.

Figure 2A:
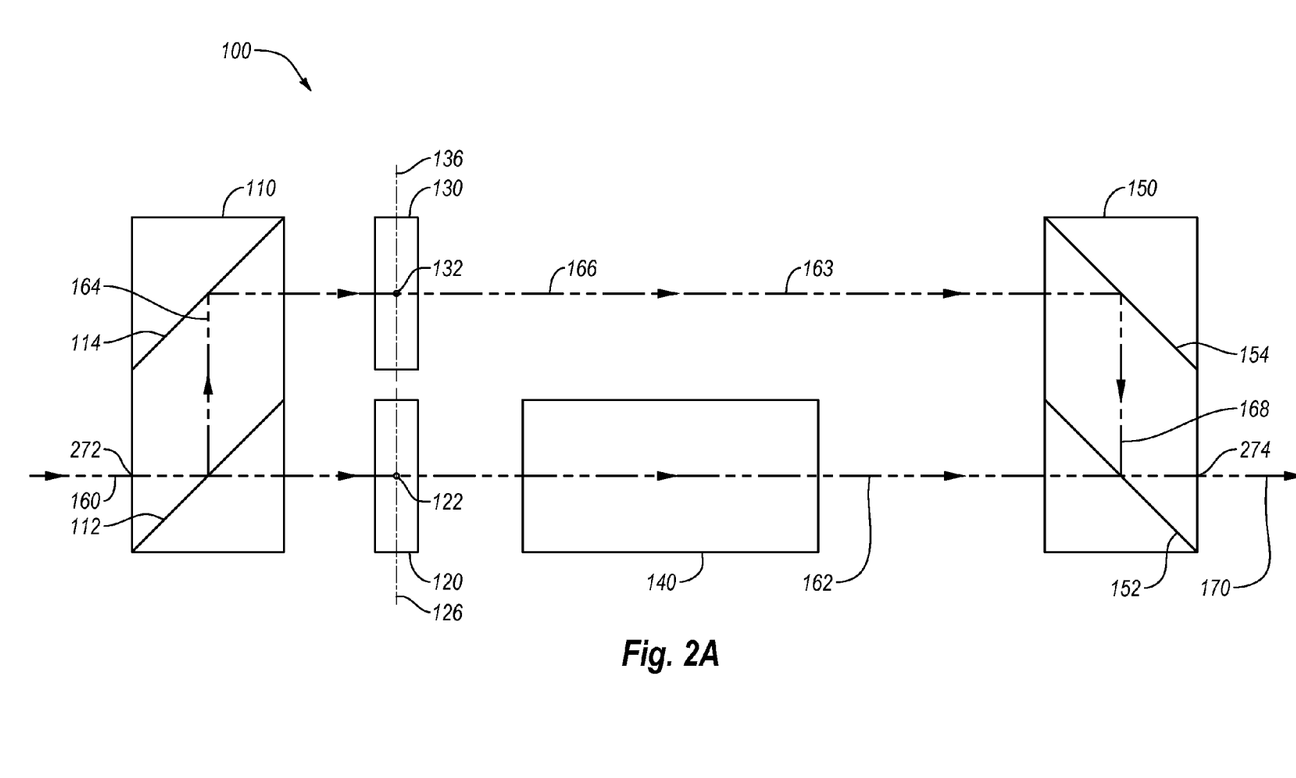
FIG. 2A illustrates a top view of the optical cell of FIG. 1.

FIG. 2A illustrates a top view of the optical cell 100 in accordance with at least some embodiments described herein. In some embodiments, the light beam 160 enters the optical cell 100 at a first port 272 located in the first block 110. The first block 110 may be configured to split the light beam 160 into first and second components. The first block 110 may also be configured to direct the first and second components of the light beam 160 on to first and second optical paths 162, 163 respectively. To split the light beam 160, the first port 272 may be aligned so that the light beam 160 strikes the splitter 112 in the first block 110. The splitter 112 may be configured to split the light beam 160 into the first and second separate components or channels. In some embodiments, the splitter 112 may split the light beam 160 into first and second components with different polarization vectors. For example, the splitter 112 may split the light beam 160 into first and second components with orthogonal polarizations. In these and other embodiments, the splitter 112 may be a multilayer dielectric polarizing beam splitter that passes one polarization component of the light beam 160 and reflects another polarization of the light beam 160. In some embodiments, the splitter 112 may split the light beam 160 into first and second components with equal or unequal intensities. In these and other embodiments, the splitter 112 may be a multi-layer dielectric beam splitter. In some embodiments, the splitter 112 may split the light beam 160 into first and second components in another manner.

After the light beam 160 is split into first and second components, the splitter 112 may be configured to direct the first component into the first optical path 162. The first component is transmitted through the splitter 112 and out of the first block 110. The first component passes through the first compensator 120 and the optical block 140 and enters the second block 150.

The splitter 112 may also be configured to direct the second component of the light beam 160 into the first leg 164 of the second optical path 163 by reflecting the second component toward the first reflector 114. The second component strikes the first reflector 114 and is reflected into the second leg 166 of the second optical path 163 and out of the first block 110. The second component passes through the second compensator 130 and into the second block 150. The second component strikes the second reflector 154 and is reflected toward the coupler 152 and into the third leg 168 of the second optical path 163.

The second block 150 may be configured to join the first and second components into the output beam 170. To do so, the first and second components of the light beam 160 may both strike the coupler 152. The coupler 152 may be configured to transmit the first component along the axis of the output beam 170. The coupler 152 may also be configured to reflect the second component along the axis of the output beam 170. In this manner, the first and second components may be joined in the output beam 170 and pass out of the second block 150 through a second port 274. In some embodiments, a light beam may propagate through the optical cell 100 in a direction opposite from light beam 160. In these and other embodiments, the coupler 152 may act as a splitter and the splitter 112 may act as a coupler.

Both of the optical paths 162, 163 have physical path lengths and optical path lengths. The optical path lengths of the optical paths 162, 163 are the sum of the product of the physical length and the index of refraction of all of the optical elements and optical material on each of the distinct optical paths 162, 163. Thus, the optical path length of the first optical path 162 is the sum of the physical lengths of the first optical path 162 through the first block 110, splitter 112, first compensator 120, optical block 140, second block 150, and coupler 152, and the optical material, i.e. air, plasma, liquid, solid, if any, between the above optical elements, where the physical length of each optical element and optical material is multiplied by the index of refraction of that optical element or material. The optical path length of the second optical path 163 is the sum of the physical lengths of the second optical path 163 through the first block 110, second compensator 130, second block 150, and the optical material, i.e. air, plasma, liquid, solid, if any, between the above optical elements, where the physical length of each optical element and optical material is multiplied by the index of refraction of that optical element or material. In some embodiments, the optical path lengths of the optical paths 162, 163 may be different. In some embodiments, the physical path lengths of the optical paths 162, 163 may be different.

Figure 2B:
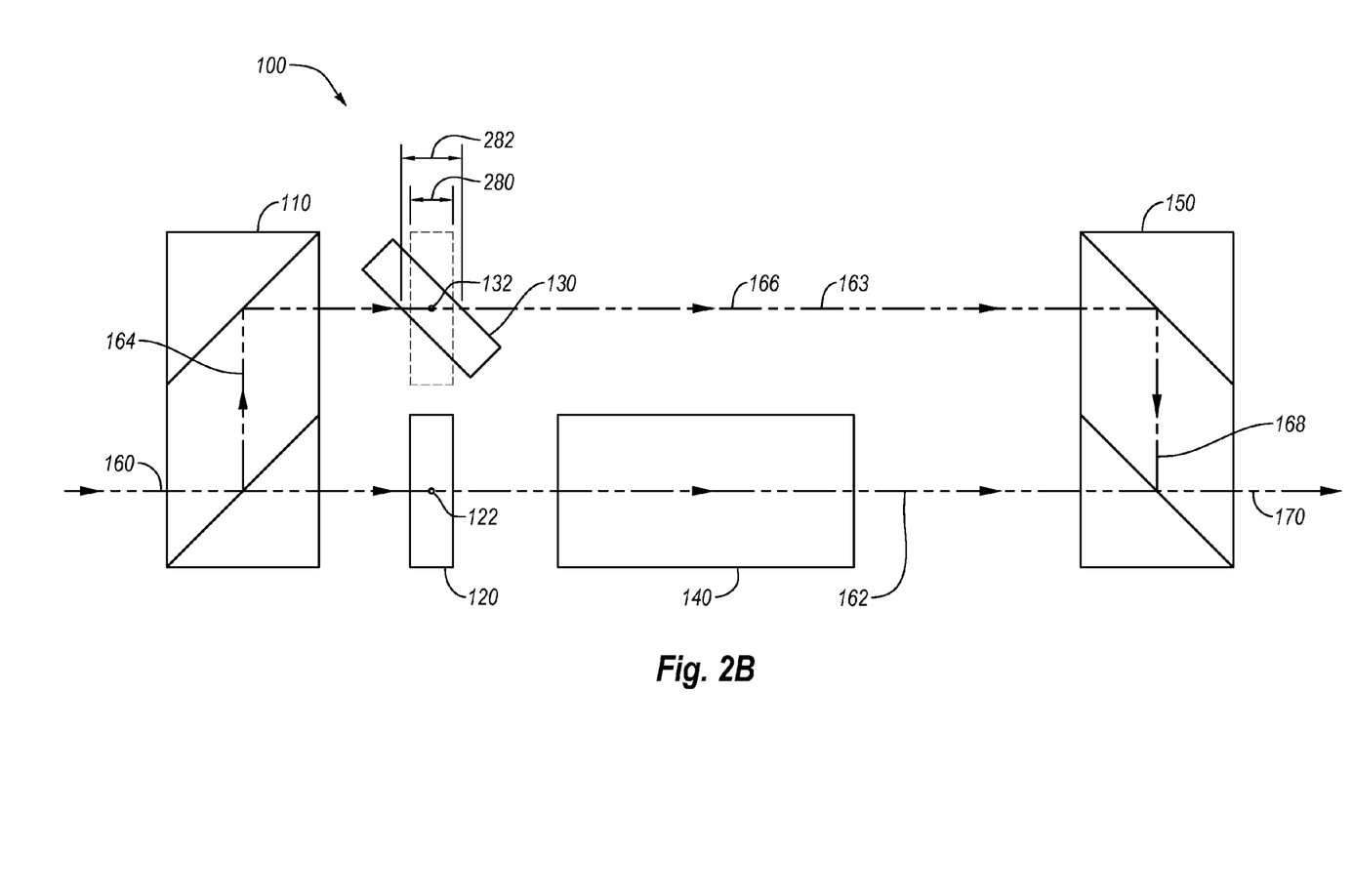
FIG. 2B illustrates another top view of the optical cell of FIG. 1.
Figure 2C:
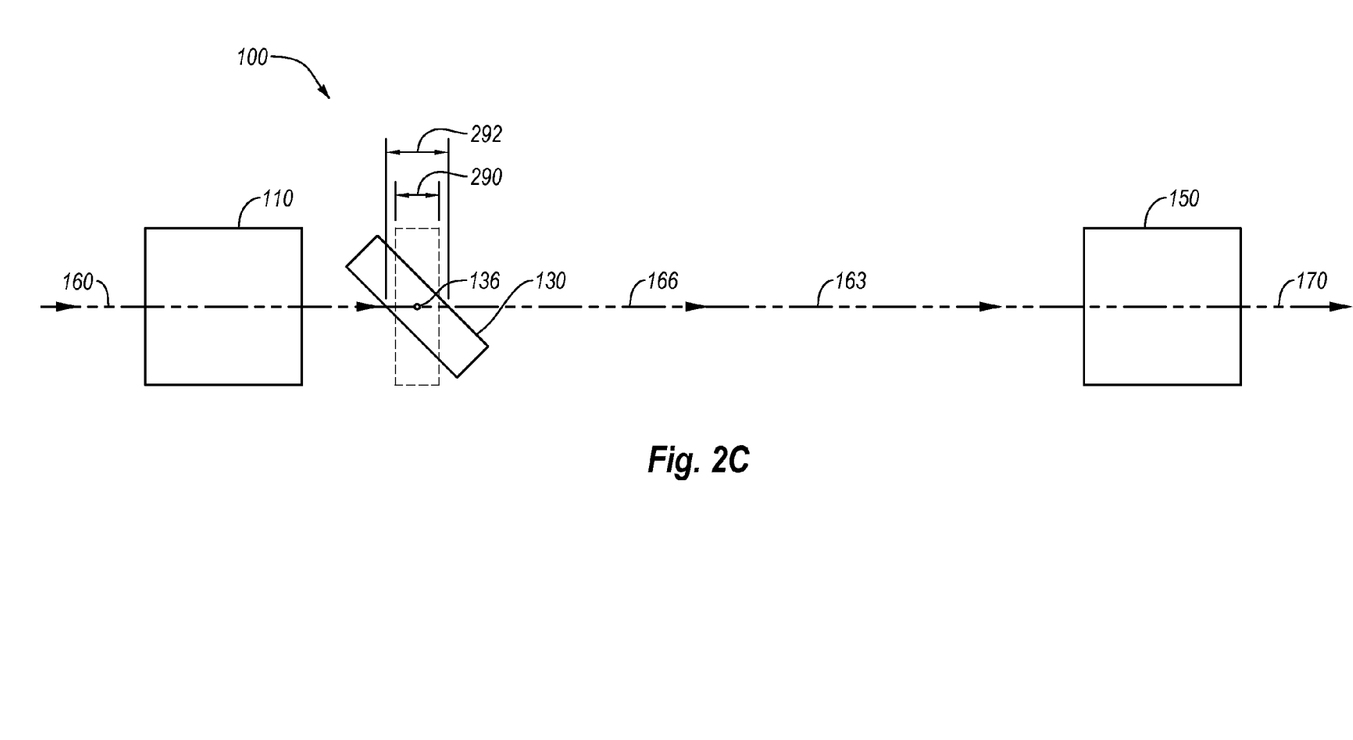
FIG. 2C illustrates a side view of the optical cell of FIG. 1.

The optical path lengths of the optical paths 162, 163 may be adjusted by adjusting the length of the physical path that each optical path 162, 163 makes through their respective compensator 120, 130. The physical lengths that each optical path 162, 163 may make through their respective compensator 120, 130 may be adjusted by rotating the respective compensator 120, 130 as illustrated in FIG. 2B and/or FIG. 2C. In particular, as illustrated in FIG. 2B, the second compensator 130 has been rotated about its first axis 132, thereby adjusting the physical path length through the second compensator 130 and thus the optical path length of the optical path 163. In FIG. 2C, the second compensator 130 has been rotated about its second axis 136, thereby adjusting the physical path length through the second compensator 130 and thus the optical path length of the optical path 163. Adjusting the optical path lengths of the optical paths 162, 163 may adjust the center wavelength of the components of the light beam 160 traversing the respective optical paths 162, 163. In the illustrated embodiment, adjusting the optical path lengths of the optical paths 162, 163 does not alter the total physical lengths of the optical paths 162, 163. The total physical lengths of the optical paths 162, 163 remain constant when the first and second compensators 120, 130 are rotated.

In some embodiments, the ability to adjust the central wavelengths of the components of light may be beneficial. For example, in some embodiments, the central wavelengths of the components of light in the optical cell 100 may be adjusted to improve central wavelength uniformity, which may reduce or substantially eliminate polarization mode dispersion. In some embodiments, improving central wavelength uniformity between components may reduce or substantially eliminate chromatic dispersion. In some embodiments, improving central wavelength uniformity between components may improve polarization dependent frequency shifts. Furthermore, the ability to adjust the central wavelengths of light may lead to reduced manufacturing costs. This may be so because the screening yield for optical elements that produce the correct optical path lengths may be low and time consuming in the absence of the first and second compensators 120 and 130 or other compensating means. The ability to adjust the optical path length allows for lowered screening criteria for optical elements and subsequently an increase in yield.

FIG. 2B illustrates a top view of the optical cell 100, in accordance with at least some embodiments described herein. FIG. 2B illustrates the second compensator 130 being rotated about the first axis 132. The physical length of the second optical path 163 through the second compensator 130 in a non-rotated state is illustrated by line 280. The non-rotated state of the second compensator 130, as illustrated in FIG. 2A, is presented by the dashed box and presents a rotation state of the second compensator 130 with the shortest physical path through the second compensator 130. The physical length of the second optical path 163 through the second compensator 130 in a rotated state, as illustrated in FIG. 2B, is illustrated by line 282. Line 282 is longer than line 280 because the physical length of the second optical path 163 through the second compensator 130 increases when the second compensator 130 is rotated to the position depicted in FIG. 2B. In the illustrated embodiment, rotating the second compensator 130 does not increase the total physical length of the second optical path 163. The total physical length of the second optical path 163 remains constant when the second compensator 130 is rotated.

FIG. 2C illustrates a side view of the optical cell 100, in accordance with at least some embodiments described herein. FIG. 2C illustrates the second compensator 130 being rotated about the second axis 136. For clarity, the first compensator 120, the optical block 140, various components within the first and second blocks 110, 150, and the second optical path 162 are not illustrated. The physical length of the second optical path 163 through the second compensator 130 in a non-rotated state is illustrated by line 290. The non-rotated state of the second compensator 130, as illustrated in FIG. 2A, is represented by the dashed box and presents a rotation state of the second compensator 130 with the shortest physical path through the second compensator 130. The physical length of the second optical path 163 through the second compensator 130 in a rotated state, as illustrated in FIG. 2C, is illustrated by line 292. Line 292 is longer than line 290 because the physical length of the second optical path 163 through the second compensator 130 increases when the second compensator 130 is rotated to the position depicted in FIG. 2C. In the illustrated embodiment, rotating the second compensator 130 does not increase the total physical length of the second optical path 163. The total physical length of the second optical path 163 remains constant when the second compensator 130 is rotated.

The optical path length of the second optical path 163 may increase when the physical length of the second optical path 163 through the second compensator 130 increases because the optical path length of the second optical path 163 is equal to a sum of the physical lengths of the optical elements multiplied by the index of refraction of each optical element. The second compensator 130 may have a higher index of refraction than the optical material through which the second optical path 163 traverses between the first and second blocks 110, 150. Thus, increasing the physical length of the second optical path 163 in an optical element with a higher index of refraction produces a longer optical path length of the second optical path 163 even though the physical length of the second optical path 163 does not change.

The ability to rotate the first and second compensators 120, 130 may allow the optical path lengths of the first and second optical paths 162, 163 to be adjusted. Accordingly, the central wavelengths of the components of the light beam 160 traversing the first and second optical paths 162, 163 respectively, may be adjusted. In some embodiments, the first and second compensators 120, 130 may be adjusted independently. In some embodiments, the first and second compensators 120, 130 may be connected and may only be adjusted together.

To increase the optical path length for the first optical path 162, the first compensator 120 may be rotated so that a larger portion of the physical path length of the first optical path 162 passes through the first compensator 120. To decrease the optical path length of the first optical path 162, the first compensator 120 may be rotated so that a smaller portion of the physical path length of the first optical path 162 passes through the first compensator 120.

Similarly, to increase the optical path length for the second optical path 163, the second compensators 130 may be rotated so that a larger portion of the physical path length of the second optical path 163 passes through the second compensators 130. To decrease the optical path length of the second optical path 163, the second compensator 130 may be rotated so that a smaller portion of the physical path length of the second optical path 163 passes through the second compensator 130.

The dimensions and shapes of the first and second compensators 120, 130 determine how much the optical path lengths of the first and second optical paths 162, 163 may be adjusted. In some embodiments, the first and second compensators 120, 130 may have the same physical path lengths when both the first and second compensators 120, 130 are in a non-rotated position, or in other words, the first and second compensators 120, 130 may have the same widths. In some embodiments, the first and second compensators 120, 130 may have different widths. In some embodiments, the first and second compensators 120, 130 may have cuboid shapes as illustrated in FIGS. 1, 2A, and 2B. In some embodiments, the first and second compensators 120, 130 may have other shapes, such as a cube, square-based pyramid, triangular based pyramid, cylinder, triangular prism, cone, or some other shape. In some embodiments, the first and second compensators 120, 130 may have the same shape with the same dimensions or the same shapes with different dimensions. In some embodiments, the first and second compensators 120, 130 may have different shapes with some identical dimensions or different shapes with no identical dimensions.

In some embodiments, the first and second compensators 120, 130 may have axis of rotation different than the first and second axes 122, 126, 132, 136. For example, the first and second compensators 120, 130 may each have an axis of rotation that extends diagonally through the first and second compensators 120, 130. Alternately or additionally, the first and second compensators 120, 130 may have more or less than two axes of rotation. For example, the first and second compensators 120, 130 may have one, three, four, or any number of axes of rotation. Alternately or additionally, the first and second compensator 120, 130 may have different axes of rotation. In some embodiments, the first and second compensators 120, 130 may be configured to rotate about a single axis of rotation at one time. In other embodiments, the first and second compensators 120, 130 may be configured to rotate about more than one axis of rotation at a given time.

In some embodiments, the first and second compensators 120, 130 may be formed from the same material, such as some form of glass. In some embodiments, the first and second compensators 120, 130 may be formed of different materials with different indexes of refraction. In some embodiments, the first compensator 120 may be rotated; the second compensator 130 may be rotated; both the first and second compensators 120, 130 may be rotated; or neither the first nor the second compensator 120, 130 may be rotated. In some embodiments, the optical cell 100 may contain only the first compensator 120 or the second compensator 130. In some embodiments, the optical cell 100 may not contain the optical block 140. In some embodiments, the optical cell 100 may not contain first and second blocks 110, 150, and only have the splitter 112, the coupler 152, and first and second reflectors 114, 154.

Figure 3:
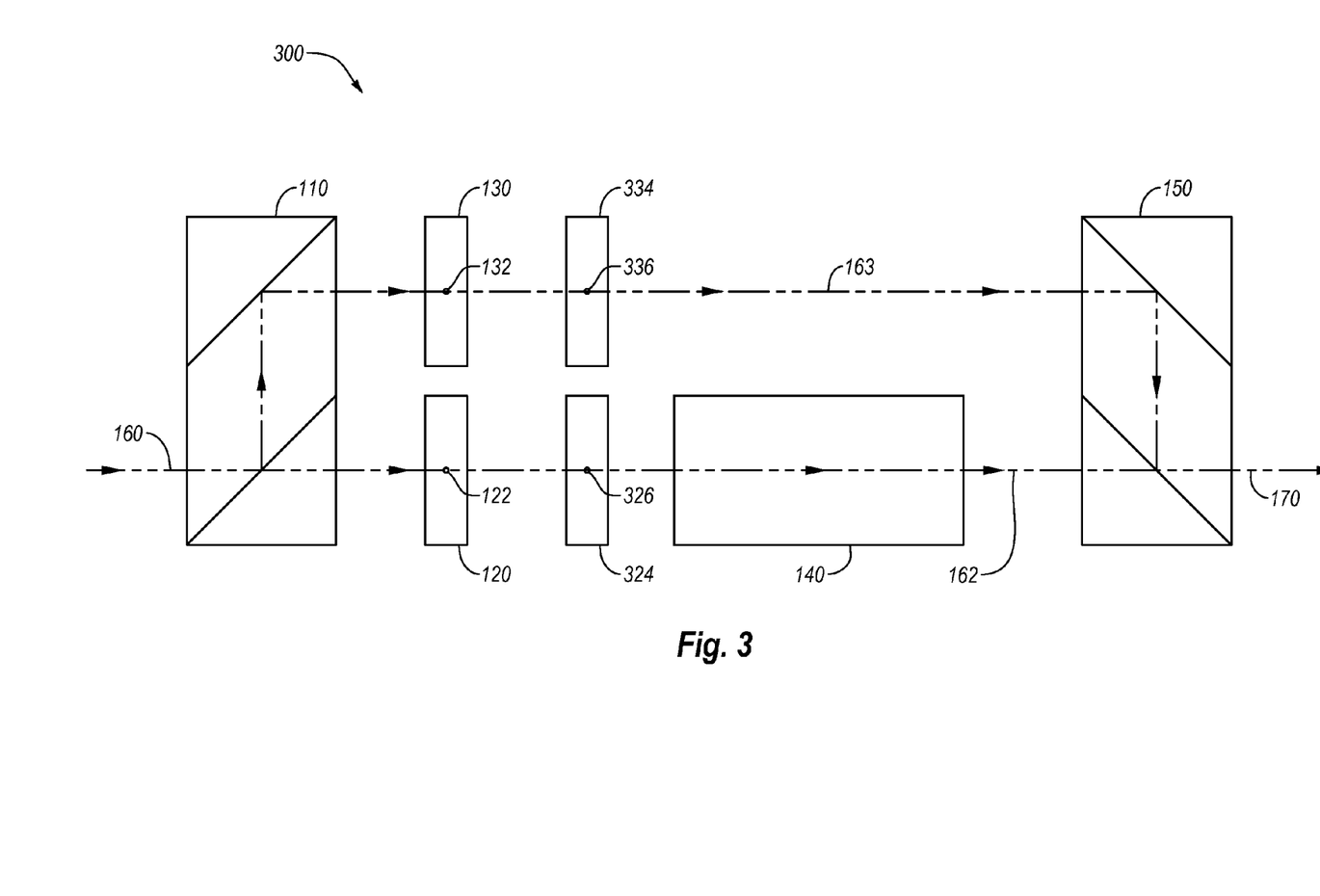
FIG. 3 illustrates a top view of another optical cell.

FIG. 3 illustrates a top view of another optical cell 300, in accordance with at least some embodiments described herein. The optical cell 300 includes all of the optical elements in the optical cell 100 illustrated in FIGS. 1, 2A, and 2B. The optical cell 300 further includes third and fourth compensators 324, 334. The third compensator 324 is located in the first optical path 162, adjacent to the first compensator 120, and between the first block 110 and the optical block 140. The fourth compensator 334 is located in the second optical path 163, adjacent to the second compensator 130, and between the first and second blocks 110, 150.

The third and fourth compensators 324, 334 may be rotated about their respective axes 326, 336. In some embodiments, rotating the third and fourth compensators 324, 334 may adjust the optical path lengths of the optical paths 162, 163. Having the third and fourth compensators 324, 334 together with the first and second compensators 120, 130 allows for larger optical path length adjustments of the optical paths 162, 163 because larger physical lengths of the optical paths 162, 163 may be within the first and second compensators 120, 130, 324, 334. In some embodiments, the third and fourth compensators 324, 334 may have similar characteristics to the first and second compensators 120, 130 discussed above. In some embodiments, the first, second, third, and fourth compensators 120, 130, 324, 334 may be configured to rotate independent of each other.

Figure 4:
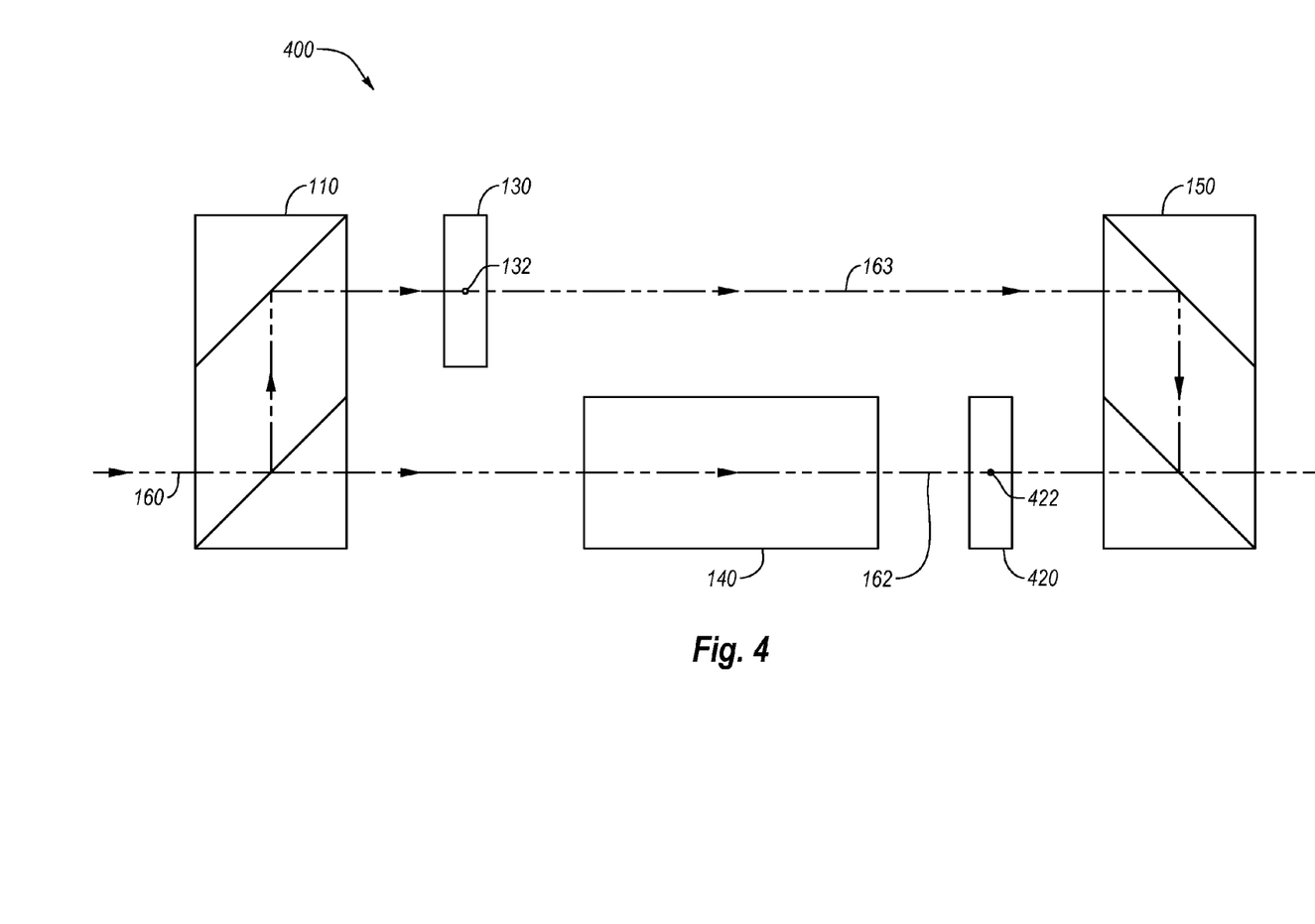
FIG. 4 illustrates a top view of yet another optical cell, all arranged in accordance with at least some embodiments described herein.

FIG. 4 illustrates a top view of yet another optical cell 400, in accordance with at least some embodiments described herein. The optical cell 400 includes the optical elements in the optical cell 100 illustrated in FIGS. 1, 2A, and 2B except for the first compensator 120. The optical cell 400 instead includes adjusted first compensator 420. The adjusted first compensator 420 is located in the first optical path 162 between the optical block 140 and the second block 150. The adjusted first compensator 420 may be configured to rotate about an axis of rotation 422. As illustrated in FIG. 4, the adjusted first compensator 420 and the second compensator 130 are not aligned like the first and second compensators 120 and 130 in FIGS. 1, 2A, and 2B. Nevertheless, the adjusted first compensator 420 may operate to adjust the optical path length of the first optical path 162 by rotating just as the first compensator 120 illustrated in FIGS. 1, 2A, and 2B.

The present invention may be embodied in other specific forms. The described example embodiments are to be considered in all respects only as illustrative and not restrictive. The scope of the invention is, therefore, indicated by the appended claims rather than by the foregoing description. All changes which come within the meaning and range of equivalency of the claims are to be embraced within their scope.

What is claimed is:

1. An optical cell comprising:
   a first port coupled to a second port by first and second optical paths; and
   a first compensator disposed in the first optical path, the first compensator rotatable about a first axis, wherein rotating the first compensator about the first axis varies a distance that the first optical path passes through the first compensator thereby changing a length of the first optical path.

2. The optical cell of claim 1, wherein rotating the first compensator changes a central wavelength of an optical signal traversing the first optical path.

3. The optical cell of claim 1, further comprising a second compensator disposed in the second optical path, the second compensator rotatable about a second axis, wherein rotating the second compensator about the second axis varies a distance that the second optical path passes through the second compensator thereby changing a length of the second optical path.

4. The optical cell of claim 3, wherein the second compensator is configured to rotate independent of the first compensator.

5. The optical cell of claim 3, wherein the second compensator is rotatable about a third axis, wherein rotating the second compensator about the third axis varies a distance that the second optical path passes through the second compensator thereby changing the second optical path length.

6. The optical cell of claim 1, wherein the first and second optical paths have different optical path lengths.

7. The optical cell of claim 1, further comprising at least one first optical element positioned in and defining the optical path length of the first optical path together with the first compensator.

8. The optical cell of claim 1, wherein the first and second optical paths accept first and second components of a light beam.

9. The optical cell of claim 1, wherein the optical cell forms part of a delay line interferometer, an interleaver, or a deinterleaver.

10. The optical cell of claim 1, wherein the first compensator is rotatable about a second axis, wherein rotating the first compensator about the second axis varies a distance that the first optical path passes through the first compensator thereby changing the first optical path length.

11. An optical cell comprising:
 a first block configured to split a light beam into first and second components and direct the first component into a first optical path having a first optical path length and the second component into a second optical path having a second optical path length;
 a second block positioned within the first and second optical paths and configured to join the first and second components into an output beam; and
 a first compensator disposed in the first optical path between the first block and the second block, the first compensator rotatable about a first axis, wherein rotating the first compensator about the first axis varies a distance that the first optical path passes through the first compensator thereby changing the first optical path length.

12. The optical cell of claim 11, further comprising a second compensator disposed in the second optical path, the second compensator rotatable about a second axis, wherein rotating the second compensator about the second axis varies a distance that the second optical path passes through the second compensator thereby changing the second optical path length.

13. The optical cell of claim 12, further comprising a third compensator disposed in the first optical path between the first compensator and the second block, the third compensator rotatable about a third axis, wherein rotating the third compensator about the third axis varies a distance that the first optical path passes through the third compensator thereby changing the first optical path length.

14. The optical cell of claim 13, wherein the third compensator is configured to rotate independent of the first compensator.

15. The optical cell of claim 11, wherein the first and second components have different polarization vectors.

16. The optical cell of claim 15, wherein the first and second components have orthogonal polarizations.

17. The optical cell of claim 11, wherein the first and second optical paths have different physical and optical path lengths.

* * * * *